United States Patent [19]

Wertz et al.

[11] Patent Number: 5,140,274

[45] Date of Patent: Aug. 18, 1992

[54] APPARATUS FOR NON-DESTRUCTIVELY MEASURING INTERNAL COATING THICKNESS AND EXPOSED METAL AREA IN CONTAINERS AND METHOD THEREFOR

[75] Inventors: Ronald D. Wertz, Boulder; H. Kent Minet, Littleton; Stephen M. Horacek, Louisville, all of Colo.

[73] Assignee: Ball Corporation, Muncie, Ind.

[21] Appl. No.: 537,036

[22] Filed: Jun. 13, 1990

[51] Int. Cl.[5] .......................................... G01R 27/26
[52] U.S. Cl. ...................................... 324/671; 427/8; 324/674
[58] Field of Search ............... 324/671, 674, 683, 686, 324/690, 699, 700, 662, 663, 707, 724, 620; 427/8, 9, 10

[56]     References Cited
U.S. PATENT DOCUMENTS

| 2,557,798 | 6/1951 | Reitz, Jr. | 324/600 |
| 4,791,354 | 12/1988 | Wardell | 324/715 |
| 4,806,849 | 2/1989 | Kihira et al. | 324/700 |
| 4,968,946 | 11/1990 | Maier | 324/671 |
| 4,968,947 | 11/1990 | Thorn | 324/709 |

FOREIGN PATENT DOCUMENTS

| 2-40870 | 8/1989 | Japan | 324/600 |
| 122903 | 9/1991 | Japan | 324/671 |

OTHER PUBLICATIONS

"Strandgauge Operating Instructions" by Strand-Electronics, Ltd., Jun. 1983.

Primary Examiner—Kenneth A. Wieder
Assistant Examiner—Maura K. Regan
Attorney, Agent, or Firm—Dorr, Carson, Sloan & Peterson

[57] ABSTRACT

An apparatus and method for non-destructively measuring the thickness of an internal coating in a container and when the internal coating is defective the area of exposed metal. The apparatus uses a frequency source which is capable of generating two sinusoidal signals of predetermined frequency and of constant amplitude wherein the two sinusoidal signals are ninety degrees apart in phase. One of the two signals is applied across a predetermined area at a selected interior configuration in the container. The applied signal has its phase and amplitude varied as a function of the thickness of the internal coating and as a function of exposed surface metal from defects in the coating. Applied signal as varied is converted to a voltage in a current-to-voltage amplifier and delivered into an electronic circuit which combines it with the second signal from the frequency source in order to produce a capacitive output indicative of the thickness of the internal coating being measured in the predetermined area. The applied signal as varied is also combined with the first signal in order to produce a resistive output indicative of the area of exposed metal. A plurality of sensing probes are placed in a container to obtain thickness and exposed metal area measurements at different predetermined areas of the container, thereby obtaining a profile of the interior coating of the container.

27 Claims, 8 Drawing Sheets

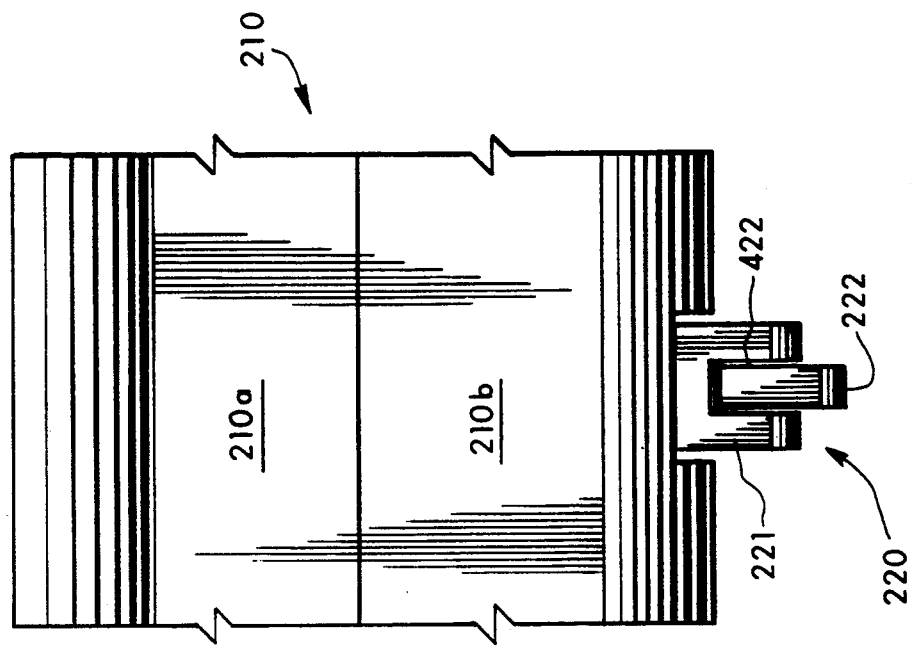
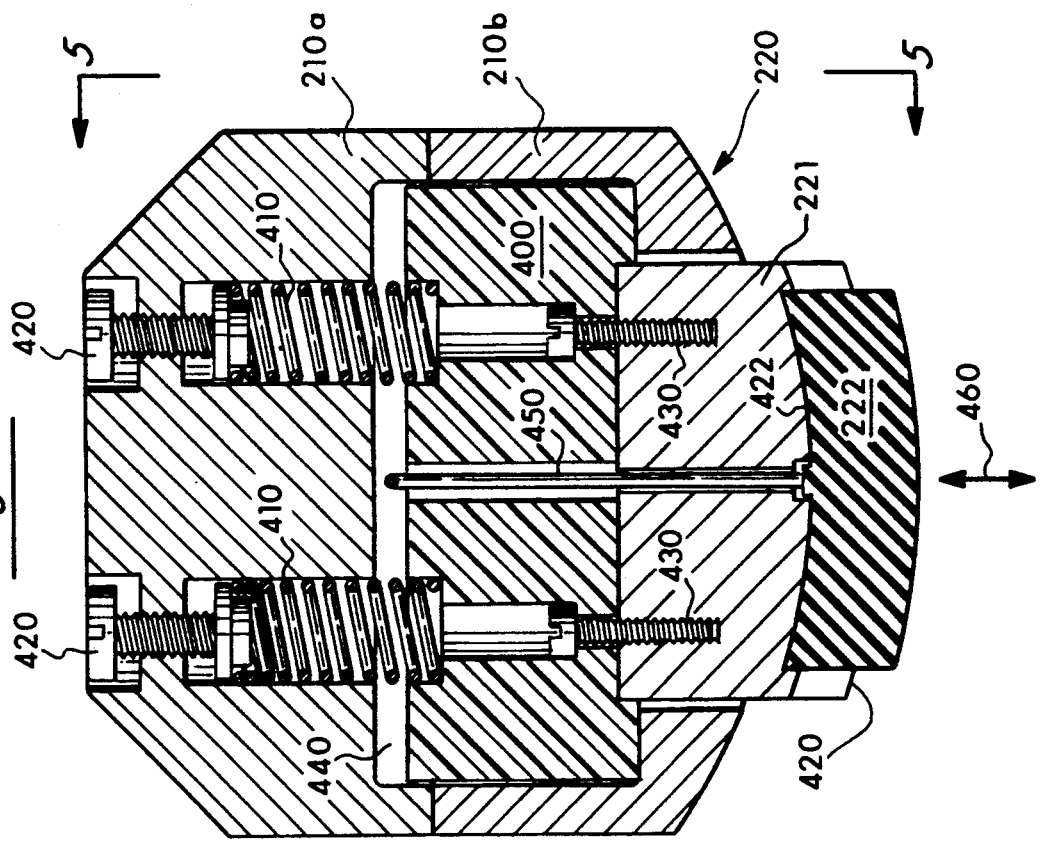

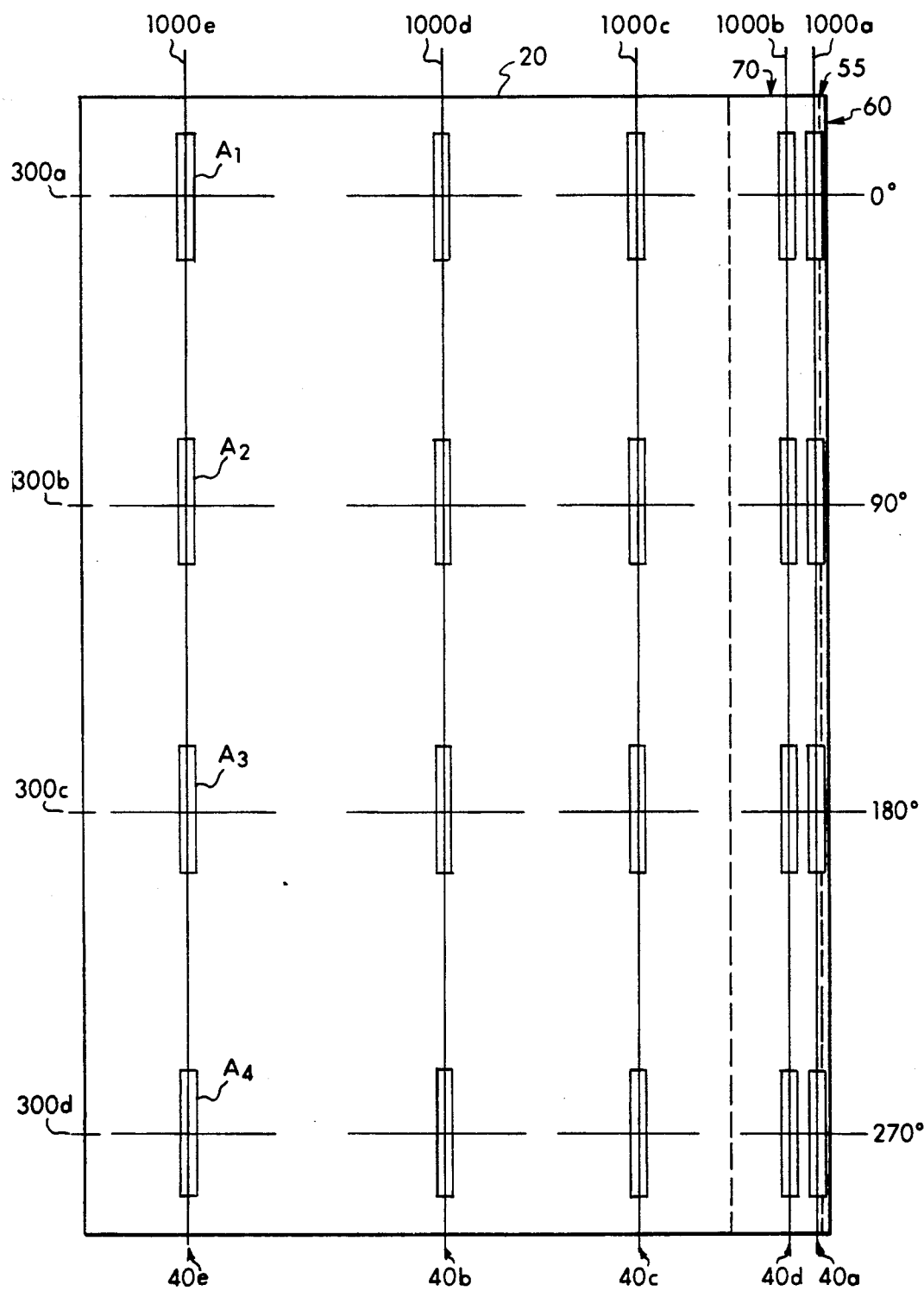

APPARATUS FOR NON-DESTRUCTIVELY MEASURING INTERNAL COATING THICKNESS AND EXPOSED METAL AREA IN CONTAINERS AND METHOD THEREFOR

BACKGROUND OF THE INVENTION

1. Field of Invention

The present invention relates to non-destructive measurements of the thickness of internal coatings for containers and of the exposed areas of the container not covered by the coatings and, in particular, the present invention relates to an apparatus and method for making a plurality of measurements of internal coating thicknesses and exposed metal areas in imperfections in the internal coatings for steel and aluminum beverage cans without destroying either the internal coating or the beverage can in the process of making the measurements.

2. Statement of the Problem

Internal coatings are provided for steel and aluminum beverage cans. These internal coatings have typical thicknesses in the range of about 0.1 to 0.5 mils. The coatings provide an inert layer between the substance placed in the container and the interior metal surface of the container so as to prevent, for example, corrosion. Such internal coatings are usually comprised of acrylic-based material sprayed or electrostatically deposited into the interior of a container at high speeds in an assembly line.

A need exists to provide an instrument and method for measuring the internal coating thickness of the container at various points within the container and to further measure the area of exposed metal found in areas of coating imperfections. Such measurements become complicated due to the different internal configurations a container may have especially in steel and aluminum beverage cans having curved neck and throat areas. These measurements are necessary to provide important feedback information for evaluating whether the coating application process is functioning properly.

One conventional approach is available for measuring the thickness of internal coatings. The STRAND-GAUGE TM film measuring gauge manufactured by STRAND ELECTRONICS INC., 21175 Nunes Avenue, P.O. Box 2672, Castro Valley, Calif. 94546, is adapted to measure the thickness of many types of coating materials including most paints, varnishes and lacquers. The STRANDGAUGE TM instrument utilizes two types of probes: a flat plate probe for measuring thicknesses of coatings on flat surfaces and a formed can probe. The formed can probe utilizes two handles connected to a common fulcrum wherein the can is slipped over a single probe head. The handles are then released and a ground lead is clipped to another portion of the can to make contact with the metal surface. In the presence of any eye holes, scratches or other breaks in the film, the STRANDGAUGE TM instrument will fluctuate or go towards zero and in order to obtain a reading, the probe must be relocated to a different portion of the sample and a reading reattempted. The STRAND-GAUGE TM instrument is not adaptable to read unusually configured internal areas such as the neck and throat areas of beverage cans. If a reading is attempted in these areas, the neck or throat area may become deformed and the coating cracked causing possible destruction in the coating. The STRANDGAUGE TM instrument is capable of only single readings and does not measure the area of exposed metal due to internal coating defects.

A need exists for an apparatus and method for the non-destructive measurement of the internal coating thicknesses and exposed metal areas in containers such as steel or aluminum beverage cans and for an apparatus that performs such measurements at a plurality of locations within the container including the throat and neck areas of a can. A need exists for an apparatus and method adaptable for use in a factory environment being capable of data storage, down loading of data, and displaying and/or printing out of the obtained data. A need further exists for an apparatus and method having suitable structural provisions incorporated so as not to damage the internal coating or the sensors upon insertion or release of the container being measured from the apparatus. A need further exists for an apparatus and method that allows repetitive readings in the same place in the container and the ability to create a profile of the internal coating of the container at precise locations within the can.

3. Solution to the Problem

The present invention provides a solution to the problem by providing a non-destructive apparatus and method for measuring a plurality of areas along a line of the container so that the throat, neck and sidewall areas of the container can be equally measured. Each measurement under the present invention is capable of obtaining the thickness of the coating or, if in the presence of a defect, the area of exposed metal.

The present invention, unlike the STRAND-GAUGE TM, provides two signals, a first output signal based upon the capacitive reactance which is indicative of the thickness of the internal coating and a second output signal based upon the resistive conductance which is indicative of the area of exposed metal in the internal coating.

The apparatus and method of the present invention is fully automatic and is adapted for factory and production line use being fully capable of storing data, down loading data, displaying and printing out the recorded data.

The present invention is designed not to damage the internal coating of the container or the sensors during the testing procedure through operator carelessness or the like.

Finally, the present invention is capable of repetitive readings in the same physical location on the coating and has the ability of creating profiles around various internal circumferences of the container.

SUMMARY OF THE INVENTION

The present invention provides an apparatus and method for measuring the thickness of an internal coating in a container and when the internal coating is defective the area of any exposed metal.

The apparatus uses a frequency source which is capable of generating two sinusoidal signals of predetermined frequency and of constant amplitude wherein the two sinusoidal signals are ninety degrees apart in phase. One of the two signals is applied across a predetermined area at a selected interior configuration in the container. The container may have a number of different interior configurations such as different curved surfaces. The electrical current through the sensor—due to the applied sinusoidal signal has its phase and amplitude varied as a function of the thickness of the internal coating and as a function of any exposed surface metal due to defects in the coating.

The current due to the first signal is converted to a voltage in a current-to-voltage amplifier and delivered into an electronic circuit which combines it with the second signal from the frequency source in order to produce a capacitive output indicative of the thickness of the internal coating being measured in the predetermined area. The voltage derived from the first signal is also combined with the first signal in a second combined means which produces a resistive output indicative of the area of exposed metal in the predetermined area. The output signal corresponding to the thickness of the internal coating is based upon the amplitude of the quadrature component and the output signal based upon the area of exposed metal is based upon the amplitude of the inphase component of the sensor current.

Under the teachings of the present invention, a plurality of sensing probes are placed in a container to obtain thickness and exposed metal area measurements at different predetermined areas of the container. The container can then be marked, rotated and another series of measurements obtained. In this fashion, a profile of the interior coating can be obtained. Furthermore, under the teachings of the present invention, the container can be removed from the apparatus and reinserted wherein the marked container can be aligned with preselected angles of rotation so that the measurement can be repeated.

The apparatus further includes a guide bar and a curved nest which cooperate together to precisely position the container in the apparatus of the present invention without damaging either the sensors or the interior coating upon insertion and removal of the container from the present invention.

The present invention utilizes a conductive rubber probe, a holder for positioning the rubber probe perpendicularly over the predetermined area of measurement for the internal coating and permitting the probe a limited degree of movement and adjustment so that the probe can be adjusted to provide a constant and predetermined area of engagement with the internal coating.

DESCRIPTION OF THE DRAWING

FIG. 4 is a cross-section through the mandrel of the tool of the present invention showing the details of a sensor;

FIG. 5 is a side planar view of the cross-section of FIG. 4;

FIG. 10 is an illustration showing the profiles measured by the present invention at 90° intervals.

DESCRIPTION OF THE PREFERRED EMBODIMENT

Figure 1:
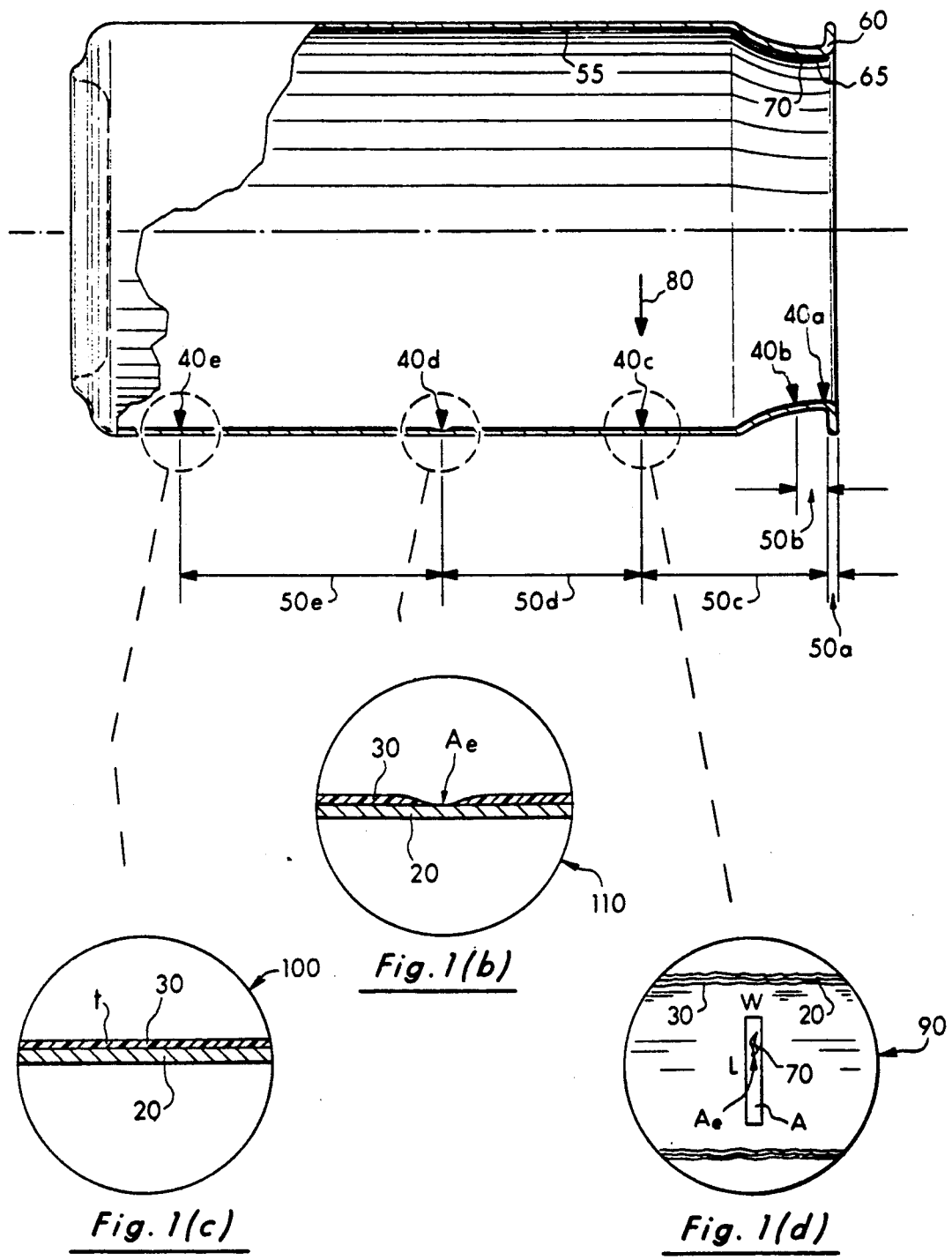
FIGS. 1a–1d are partial cross-sections of a beverage can illustrating five measurement points along a line in the bottom of the can.

FIG. 1 illustrates a conventional beverage can 10 which could be made of either steel or aluminum. It is to be expressly understood that while the apparatus and method of the present invention is discussed with respect to a preferred embodiment for a beverage can, the principles of the present invention could be modified for use in other types of containers, different container configurations, and other applications wherein the container has an internal coating. In the beverage can 10 of FIG. 1, the can is formed from material 20 such as aluminum or steel in a desired configuration having a number of different internal configurations. The can 10 has several different internal configurations such as the cylindrical body 55, flange 60, the throat 65 and the neck 70. An internal coating 30 is deposited on the entire internal surface of can 10.

The present invention at points 40a through 40e measure the thickness of the internal coating 30 or, in the presence of an imperfection or a defect, the area, $A_e$, of the exposed metal 20. In the preferred embodiment, measurement point 40a is located on the throat 65 of can 10 at a distance 0.100 inches from the opening of the can as indicated by arrow 50a. From measurement point 40a, a second measurement point 40b on the neck 70 occurs at 0.200 inches as indicated by arrow 50b. Also from point 40a a third measurement 40c on the cylindrical body 55 occurs at 0.960 inches which is indicated by arrow 50c. Measurement point 40d on the cylindrical body 55 occurs at 1.600 inches from measurement point 40c as indicated by arrow 50d and, finally, measurement point 40e on the cylindrical body 55 occurs at 1.600 inches from measurement point 40d as indicated by arrow 50e.

As illustrated in the enlargement 90 of FIG. 1 (which is a top view from inside container 10 as indicated by arrow 80) for location 40c, the present invention measures the thickness, t, of the internal coating 30 over a predetermined area, Ae, having a length, L, and a width, W. In the presence of a defect 70, an area of exposed metal, $A_e$, may be present. The same predetermined area, A, exists at each location 40 under the teachings of the present invention. It is to be expressly understood that this sameness of area is a preferred embodiment and that different predetermined areas could be utilized at different locations 40 in the container.

It is to be expressly understood that the present invention is designed to measure the thickness (e.g., t at 40e in the enlargement 100 of FIG. 1) of the internal coating 30 and exposed metal areas (e.g., $A_e$ at 40d in the enlargement 110 of FIG. 1) at five different locations of container 10. Locations 40a, 40b and 40c–40e placed at regions of different internal configurations.

However, the present invention is not limited to the use of five sensors nor to the location of the sensors in the throat 65, neck 70 or sidewall 55 areas of the container. Rather, any number of sensors could be utilized at different locations in the container 10 of FIG. 1 or in differently configured containers under the teachings of the present invention. FIG. 1 is only a preferred embodiment of one approach for the present invention and that particular configuration is not meant to limit the teachings found herein.

1. General Description

Figure 2:
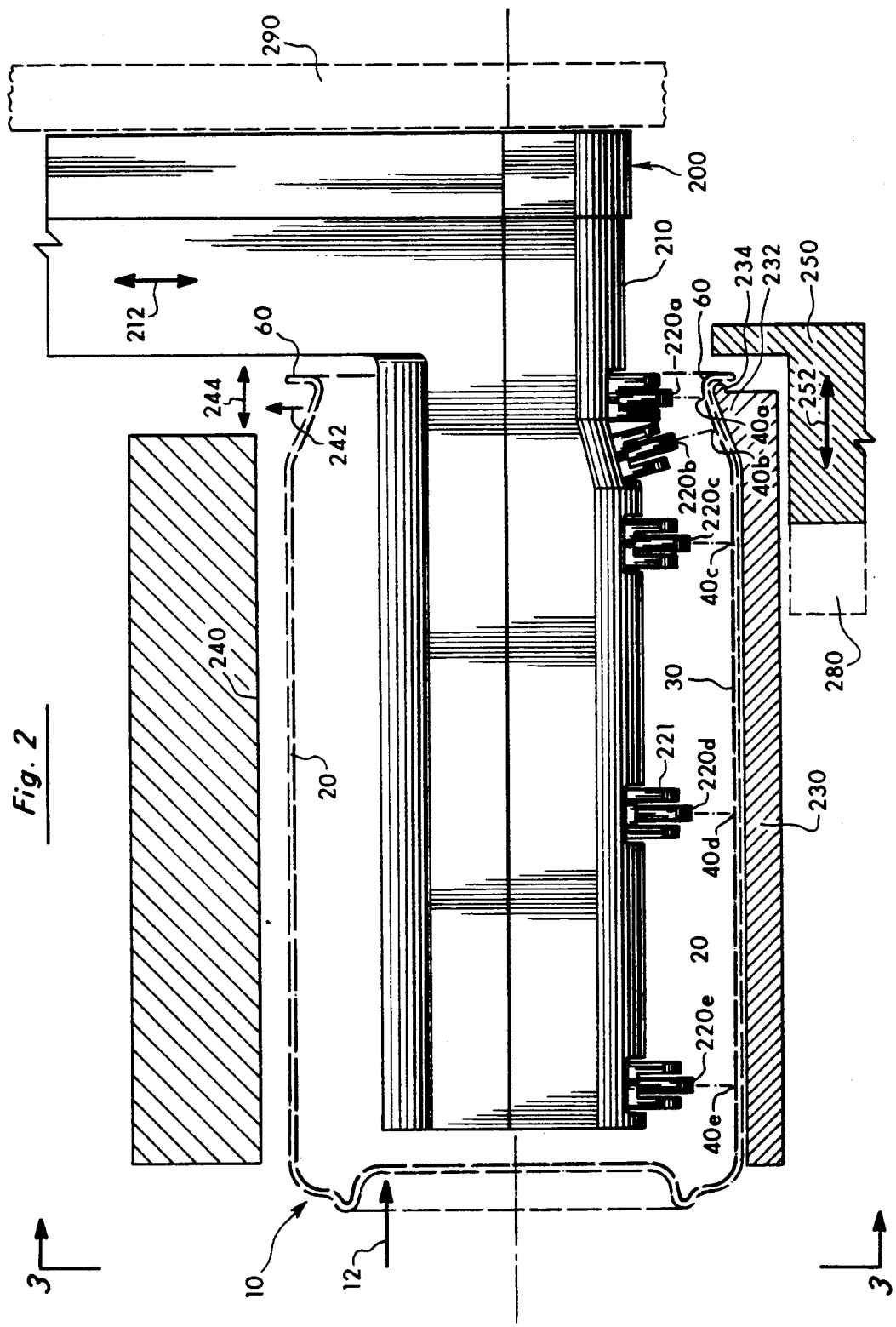
FIG. 2 is an illustration of the present invention setting forth components of the tool for measuring the internal coatings of a can at the five points of FIG. 1.
Figure 3:
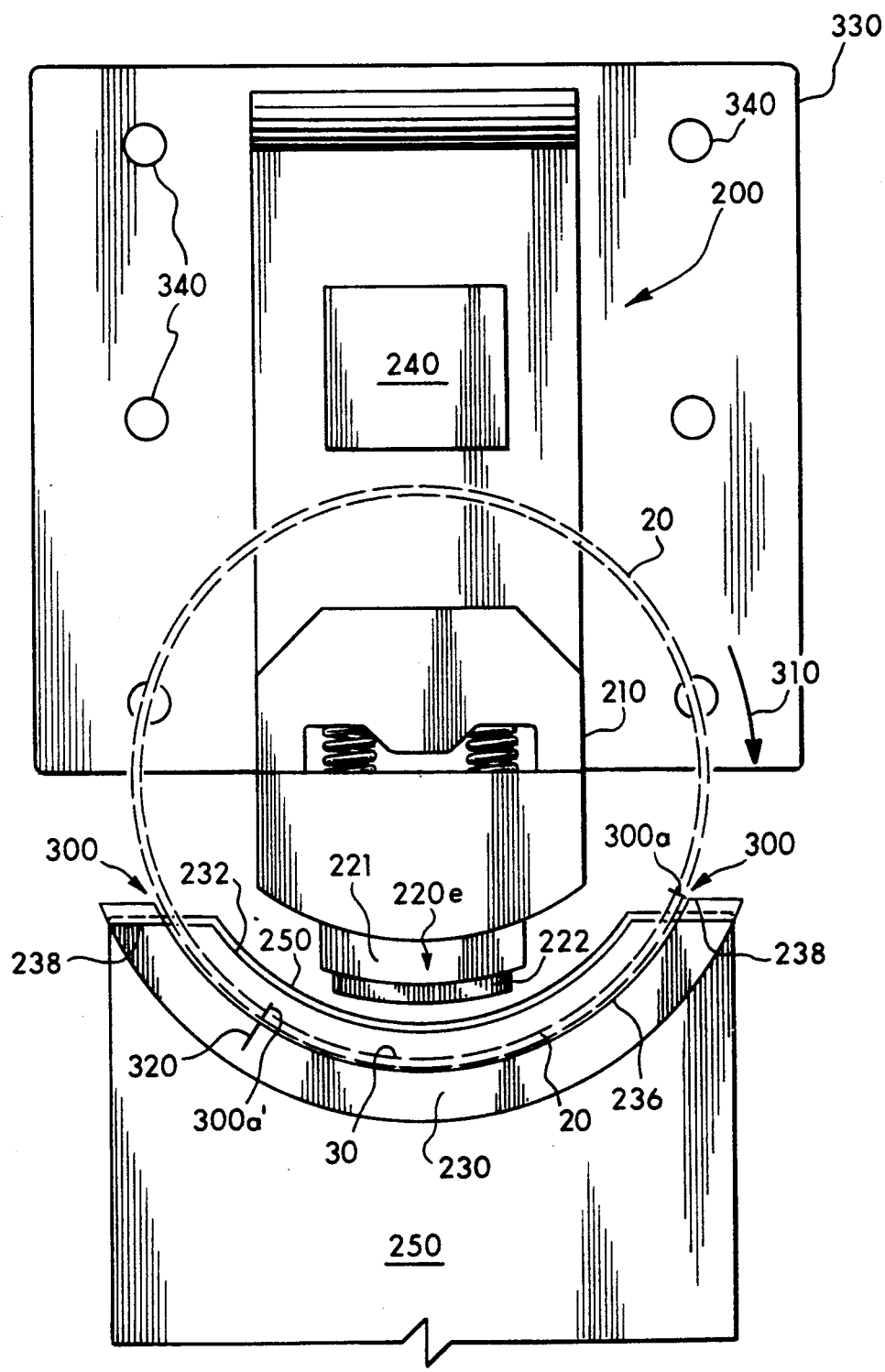
FIG. 3 is a front planar view of the tool of the present invention.

In FIGS. 2 and 3, the tool 200 for holding the sensors of the present invention is shown. The tool 200 includes a mandrel 210 having a plurality of sensors 220a through 220e, a curved measurement nest 230, a guide bar 240, and a flange clamp 250. The mandrel 210 moves upwardly and downwardly in the direction of arrow 212, the flange clamp 250 moves inwardly and outwardly in the direction of arrow 252 and the guide bar 240 and the curved measurement nest 230 are stationary.

As shown in FIG. 2, the mandrel 210 is in an upward position and the flange clamp 250 is in an outward unclamped position. A beverage can 10 is inserted into the tool 200 in the direction of arrow 12 by an operator. The flange 60 of the can 10 follows under the guide bar 240 and above the curved measurement nest 230.

The provision of the guide bar 240 is important since it prevents the operator of the apparatus of the present invention from inserting the can 10 in a fashion that would cause the can to hit or abrade against the sensors 220. Not only does this prevent damage to the sensors 220, but the guide bar 240 also prevents scratching or creating imperfections on the internal coating 30 of the can. The guide bar 240 in cooperation with the curved nest insures consistent and proper insertion of the can 10 into and removal from the tool 200 which is important when used in a factory environment.

While the guide bar 240 is shown to be of rectangular cross-section in FIG. 3, it is to be especially understood that other geometric shapes could be utilized. For example, a downwardly curved nest could be placed above the can 10. Furthermore, the guide bar could be located in different physical locations and still function to properly insert the can into the tool. Finally, more than one guide bar could be utilized. For example, two cylindrical bars could be used spaced apart from each other and above the can 10.

The rearward portion of the curved nest 230 terminates in an upwardly curved surface 232 to fully support the configuration of the neck area 70 of can 10. When the can 10 is fully inserted in the direction of arrow 12, the flange portion 60 drops over the end 234 of nest 230. The guide bar 240 is of sufficient length so that as the flange 60 rides along the upwardly curved surface 232, the can rises upwardly in the direction of arrow 242. A sufficient space 244 is provided behind the guide 240 to allow the can to rise in the direction of arrow 242 until it drops over edge 234 of the curved nest 230. As mentioned, the curved nest 230 and the guide bar 240 are stationary being firmly affixed, not shown, in the tool. Brackets, braces, housings, and supports can be conventionally connected to the guide bar 240 and to the curved nest 230 to hold them firmly stationary.

It is to be fully appreciated that the shape of portion 232 of the curved measurement nest 230 can be any convenient shape to fully match to the shape of the container. The teachings of the present invention are not limited to the configuration of the can 10 shown in FIG. 1.

As shown in FIG. 3, the curved measurement nest 230 has a circular curve 236 which forms a circumferential cup about the lower circumference of the cylindrical body 55 of the can 10. The radius of the curved nest substantially corresponds with the radius of the cylindrical body 55. Again, the radius of the curved nest 230 can be any suitable radius to conform to the desired container being tested.

After the can 10 is fully inserted so that flange 60 drops over edge 234 of the curved nest 230, the tool of the present invention advances clamp 250 in the direction of arrow 252 to firmly clamp the flange 60 against edge 234 of the curved measurement nest 230. The clamp 250 firmly holds the curved bottom portion of the flange 60 of the can 10 in place in the tool 200. It is to be understood that any conventional movement means 280 such as a pneumatic drive, stepping motor, spring mechanism, etc. could be utilized to provide this movement.

After firmly clamping the can 10 into the tool 200, the mandrel 210 moves in the direction of arrow 212 to lower the interior coating 30 of the can. As shown in FIG. 3, each probe 220 has a metal portion 221 and a sensor portion 222. Both portions are curved having the same radius of curvature as the can 10. The mandrel 210 positions the probes 220 so as to be centrally aligned with and perpendicular to the bottom of the curved nest 230. The mandrel 210 is lowered until the sensors 222 firmly engage the interior coating 30 of the can 10 and the mandrel is held in position while the measurements are being taken. The details of the mechanism 290 clamped to the support plate 330 via holes 340 are not important to the present invention. The desired movement 212 can be achieved by means of a pneumatic drive, stepping motor, spring mechanism, etc.

The sensors 222 are applied with equal pressure to the internal coating and to the can. Hence, with the can fully inserted into the tool 200, with the clamp 250 fully activated, and with the mandrel 210 fully engaging the can, the probes 220 align with the measurement points 40 as shown in FIG. 1. Each sensor 222 engages the same predetermined area, A, or footprint on the internal coating as shown in FIG. 1 (enlargement 90).

2. Creating a Profile and Repetitive Readings

Once fully inserted and with clamp 250 activated to firmly hold the flange 60 of the can 10, a mark 300a on the can be made by the operator, for example with a stylus (not shown), at the juncture of edge 238 of the nest 230 and the exterior of the can 10 as indicated by arrow 300. Such marking can also be automatically made by a marking device (not shown) attached to the tool 200. It is to be expressly understood that the can, upon removal from the tool 200, can be reinserted into the tool having the mark made at 300a positioned with the edge 238 of the curved nest 230. Re-engaging the tool will position the sensors 222 to precisely the same measuring points 40. This permits repetitive readings by the instrument of the present invention of the interior coatings at the same locations.

It is also to be expressly understood that the can 10 can be manually rotated in the direction of arrow 310 to any of a number of positions with similar marks being made at edge 238 as shown by arrow 300 so that a profile around the interior circumference of the coating can be generated. For example, should it be desired to have readings taken every ninety degrees, the can 10 would be inserted and an initial mark being made indicating a reading at zero degrees. The can 10 would be rotated before the next measurement so that the previous mark would align with a 90° reference such as shown by scribed indicia 320 on the nest 230. In FIG. 3, mark 300a is aligned with indicia 320. The five readings at locations 40 would then take place. This process would be repeated for two additional readings with the can being turned ninety degrees in the direction of arrow 310 for each subsequent reading. More or less than four separate readings could be taken and the scribe marks 320 can be suitably located at any preselected angle of rotation, for example, readings at 45° or 30° intervals.

FIG. 10 illustrates the measurement profiles obtained through use of the present invention. At each point 40, a line 1000 is drawn which represents a circular profile line inside the can 10. Each profile line 1000 has four predetermined area measurements $A_1, A_2, A_3, A_4$, taken by the present invention at 90° intervals wherein the areas are the same. Marks 300 are made on the can to indicate the 90° intervals. For each of the twenty areas shown in FIG. 10, a separate measurement of the thickness, t, of the internal coating (or exposed metal) is made.

Hence, under the teachings of the present invention, any number of sensors 222 could be used. The sensors 222 could be placed at any desired spacing or location along the length of the container or at different internal configurations (i.e., neck or throat configurations). Any number of separate readings could be taken, and readings can easily be repeated. All of the above occurs without destroying the shape of can or affecting the integrity of the interior coating of the can during the measurement process.

3. Details of Probe 220

Figure 6:
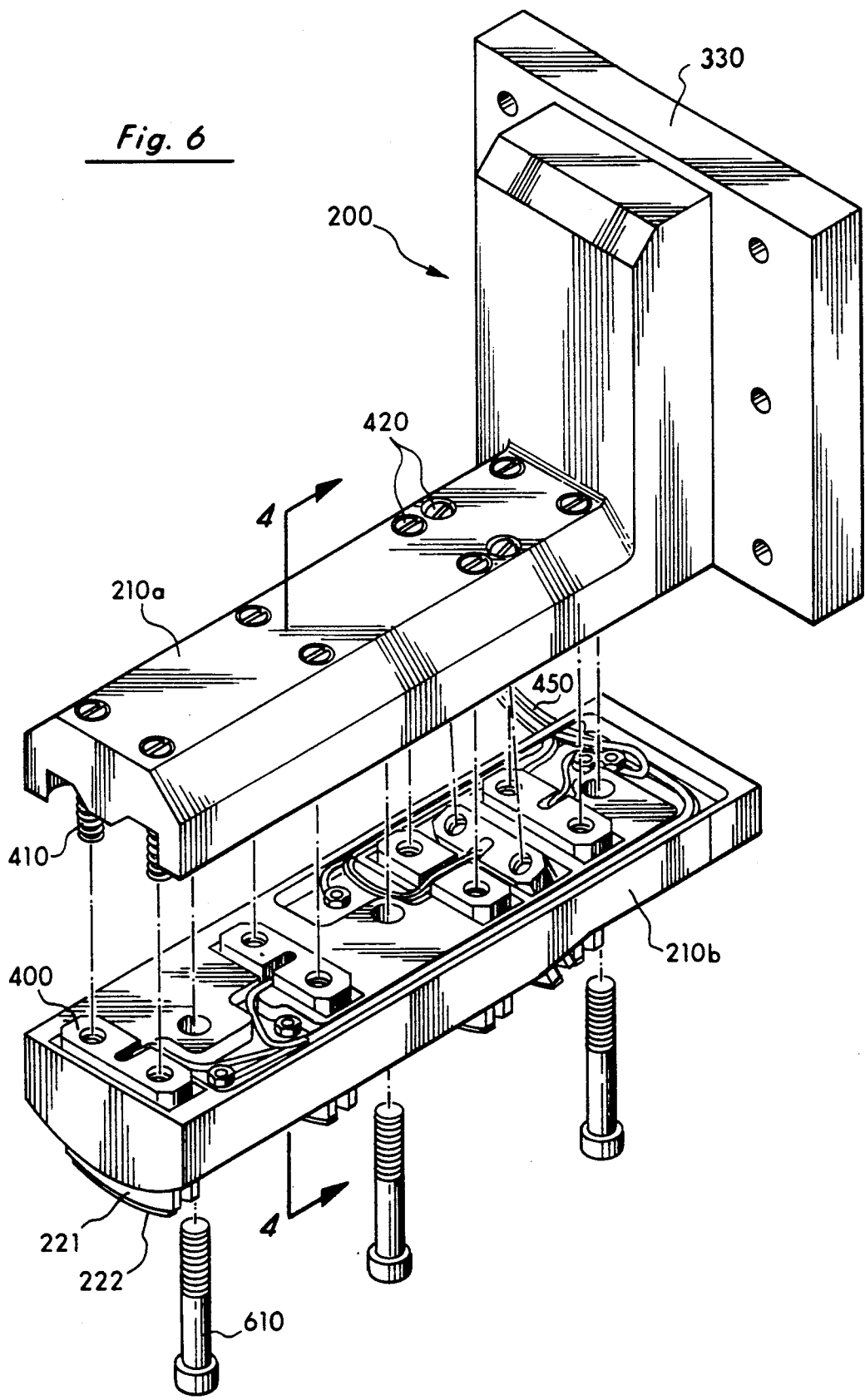
FIG. 6 is an exploded view of the mandrel of the present invention.

In FIGS. 4 through 6, details of the probe construction for the preferred embodiment are set forth. The probe 220 has a rubber sensor 222, a steel holder 221, a carrier 400, tension springs 410, and adjustment screws 420.

The sensor 222 is a flexible carbon filled silicon material which is electrically conductive such as that manufactured by Vernay Laboratories, Inc., 77 South College Street, Yellow Springs, Ohio 45387 and sold as Model No. UL-1005M20. The steel holder 221 is machined to have one end curved 420 with a radius of curvature matching the radius of curvature for the nest 230. A corresponding slot 422 is formed on end 420 and the sensor 222 press-fittingly engages the formed slot 422 so as to assume the curvature 420. The steel holder 221, in turn, is connected by means of screws 430 to a carrier 400. The carrier 400 is made from a suitable material having inherent properties of lubrication or a low coefficient of friction such as TEFLON. The carrier 400 engages a formed slot 440 in the mandrel 210 so that the sensor 222, steel holder 221, and carrier 400 can freely move in the directions of arrows 460. Carrier 400 holds the steel holder 221 in a manner that precludes the steel holder 221 from ever contacting the mandrel 210.

The entire assembly (i.e., carrier 400, holder 221, and sensor 222) is under a force from springs 410. These springs are designed to apply a desired pressure when the mandrel 210 is lowered in conducting measurements. Adjustment screws 420 are used to calibrate the machine in order to assure that each flexible sensor 222 applies a sufficient amount of pressure on the can while being measured so that the predetermined amount of contact area, A, is the same for each probe. A greater force enlarges the area of probe contact while a lesser force lessens contact area.

The springs 410 are designed and the cavity 440 is designed to allow about one-half inch movement in the preferred embodiment. When the adjustment screws 420 properly adjust the sensors 222, each of the sensors 222 of FIG. 2 will measure the same area of internal coating 30 at each of the points 40 on the can. In other words, the springs 410 are adjusted to apply proper pressure to sensors 222 so that when the sensors 222 perpendicularly engage the internal coating 30 of the can when fully mounted in tool 200 the area between the sensor 222 and the internal coating is the same for each of the sensors. It is to be expressly understood that while adjustable springs are utilized to provide adjustment forces, other mechanical arrangements could be utilized to provide such a force.

In the preferred embodiment, each sensor 222 is carefully cut, in the preferred embodiment, to the following dimensions: 0.100" wide, 0.600" long and 0.125" thick.

The sensor 222 is interconnected with an electrical wire 450 which conveys an electrical signal from the sensor 222 to the electronics of the present invention.

The mandrel positions the probe assembly perpendicularly over the predetermined area of the internal coating to be measured and the probe assembly is capable of a predetermined amount of movement within the mandrel. The springs then provide a selected amount of force to cause the rubber sensor to engage the interior coating in the amount of the actual predetermined area, A, without causing destruction to the internal coating.

It is to be expressly understood that the embodiment of the probe 220 shown in FIGS. 4 and 5 is a preferred embodiment and that variations of this embodiment could be implemented under the teachings of the present invention. For example, one or more than two adjustment springs 410 could be utilized for the adjustment of each probe 220. The length of the sensor 222 with respect to the mandrel can be selectively increased or decreased.

4. Details of Mandrel 210

The mandrel 210 is designed to split into two separate halves 210a and 210b as shown in FIG. 6. When separated, each probe assembly can be removed for repair or maintenance. The upper half 210a is attached to drive plate 330. The upper and lower halves 210a and 210b are connected together by means of bolts 610 engaging threaded holes (not shown) in the upper half 210a.

A number of different mandrel configurations could be used under the teachings of the present invention to position the probes 220 perpendicularly to the desired internal configuration of the container. This is shown in FIG. 2 for probe 220b which shows the angular positioning of the probe in the mandrel in order to be perpendicular to the neck 70 of the can at point 40a.

5. Analog Section

Figure 7:
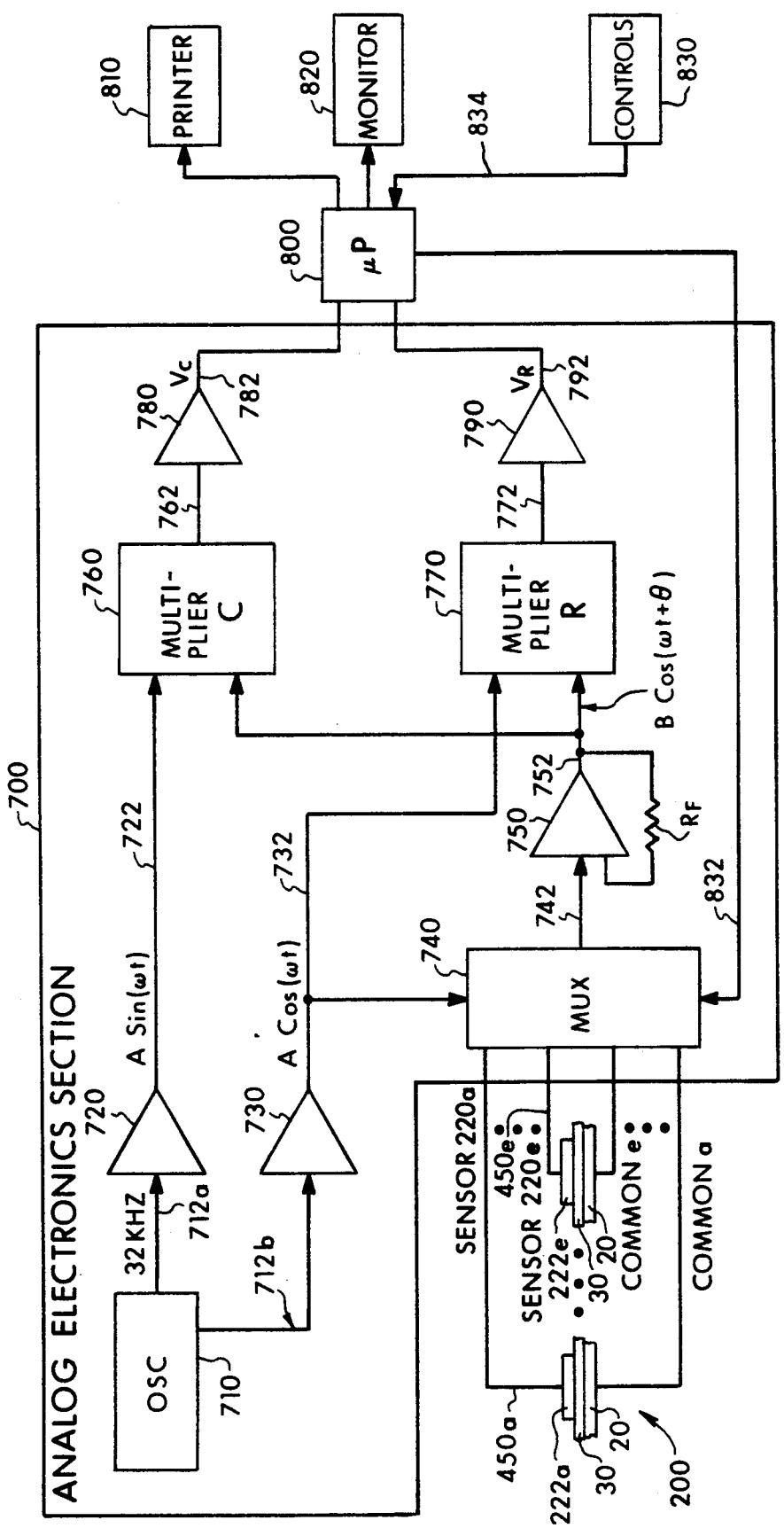
FIG. 7 is a block diagram schematic of the internal electronic section of the present invention.

In FIG. 7, the details of the analog electronic section 700 of the present invention is set forth. This section includes an oscillator 710, amplifiers 720 and 730, a multiplexer 740, an amplifier 750, multipliers 760 and 770, amplifiers 780 and 790, a microprocessor 800, a printer 810, a monitor 820, and a set of controls 830.

The oscillator 710, in the preferred embodiment, utilizes a pair of LF412 integrating amplifiers to generate a 32 kilohertz signal on lines 712a and 712b. It is to be expressly understood that any suitable frequency could be used and that the teachings of the present invention are not limited to 32 kilohertz. For example, any frequency in a range of about 10 to 50 kilohertz could be used. The loop gain of oscillator 710 is adjusted to obtain the desired oscillating frequency. The 32 kilohertz signal on lines 712 is delivered into amplifiers 720 and 730. The signals on the two lines 712a and 712b differ in phase by 90 degrees.

Amplifier 720 is conventionally available as Model No. LH0032 and outputs the following signal: $A\sin(\omega t)$. Amplifier 730 utilizes a conventionally available model LF351 to output the following signal: $A\cos(\omega t)$. The signals on lines 722 and 732 are 90° out of phase, one from the other, and are delivered to multipliers 760 and 770 respectively.

The $A\cos(\omega t)$ signal on line 732 is also delivered to a multiplexer 740. In the preferred embodiment, the multiplexer is a model D6507A. The multiplexer is interconnected over lines 450 to the sensors 200 shown in FIG. 2 of the present invention. Oscillator 710 and amplifiers 720 and 730 operate to provide two output sinusoidal signals of predetermined frequency which are ninety degrees out of phase with each other: $A\sin(\omega t)$ and $A\cos(\omega t)$.

The multiplexer 740 selectively obtains a reading from each sensor 222a through 222e which provides a current signal carrying information as to the thickness, t, of the internal coating 30 or the area of any exposed metal surface, $A_e$, or a combination thereof. The signal appearing on line 742 is delivered by the multiplexer 740 sequentially through each given sensor 222. The multiplexer 740 can be manually sequenced such as with 5 switches or automatically sequenced by microprocessor 800 over line 832. The output common is connected back through the multiplexer to deliver a combined output signal on line 742. This output current signal is delivered into current to voltage amplifier 750 to produce on line 752 the following signal: $B\cos(\omega t + \theta)$. The gain of the current to voltage conversion is set by the feedback resistor $R_F$. The signal on line 752 is delivered to Multiplier C 760 and to Multiplier R 770. The output of Multiplier C 760 is delivered on line 762 through an operational amplifier 780 to produce an output signal $V_c$ on line 782. $V_c$ is proportional to the capacitive conductance of the internal coating. The output of Multiplier R 770 is delivered on line 772 through operational amplifier 790 to produce output $V_R$ on line 792. $V_R$ is proportional to the resistive conductance of the coating. In the preferred embodiment, amplifier 750 is conventionally available as model no. LH0032, multipliers 760 and 770 are available as model nos. MC1494 and operational amplifier 780 and 790 are available as model nos. LF351.

In summary, multiplexer 740, sensor 222, and amplifier 750 function together to apply the $A\cos(\omega t)$ signal across the internal coating in a predetermined area of said container thereby to generate a signal whose phase ($\theta$) and amplitude B are dependent upon the thickness, t, of the internal coating and the area, $A_e$, of exposed metal. The multiplexer 740 is capable of sequentially applying the $A\cos(\omega t\theta)$ signal to a plurality of different predetermined areas in the container to provide a new $B\cos(\omega t + \theta)$ signal for each different area.

6. Operation of Electronics

The outputs $V_c$ and $V_R$ may be evaluated in a number of conventional approaches. In the preferred embodiment, these outputs access a microprocessor. Outputs $V_c$ and $V_R$ may vary in voltage from: 0 to 5 volts.

The resulting outputs $V_c$ and $V_R$ are determined according to the following two equations:

FORMULA 1:

$$E_0 = \left(\frac{R_F}{R_C}\right) A\cos(\omega t) + i\left(\frac{R_F}{X_C}\right) A\cos(\omega t)$$

FORMULA 2:

$$E_o = \left(\frac{R_F}{R_C}\right) A\cos(\omega t) + \left(\frac{R_F}{X_C}\right) A\sin(\omega t)$$

$$= E_R \cos(\omega t) + E_C \sin(\omega t)$$

Figure 8:
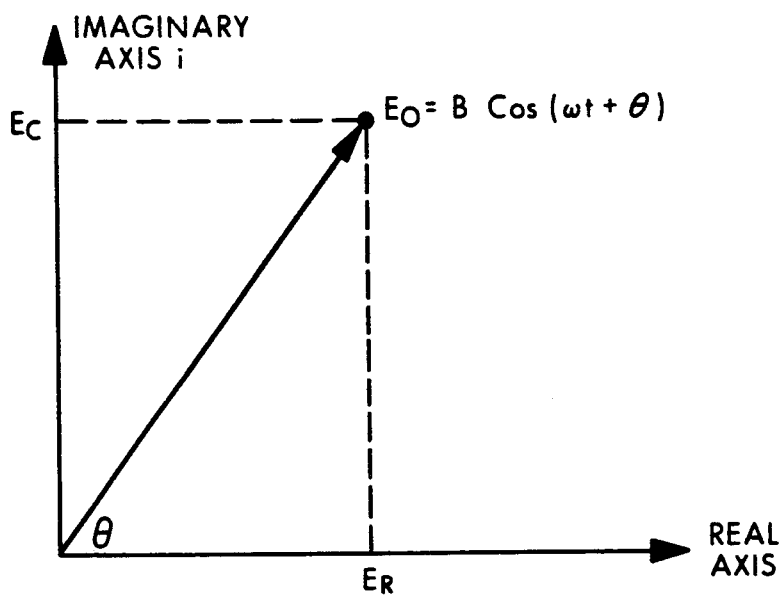
FIG. 8 is a graph illustrating the imaginary and real components of the output signal of the present invention.

Referring to FIG. 8,

FORMULA 3:

$$E_o = B\cos(\omega t + \theta)$$

Where, $$B = \sqrt{E_R^2 + E_C^2}$$

$$\theta = \tan^{-1}\frac{E_C}{E_R}$$

B, $E_R$, and $E_C$ are the amplitudes of the sin wave signals. As shown in FIG. 8, the signal out of each sequentially accessed sensor 222 is shifted in phase by an angle $\theta$ from the input signal on line 732. If, for example, there is no resistive component to the coating 30 (i.e., no area of exposed metal), $\theta$ will be 90° and the voltage B will equal $E_C$. The $B\cos(\omega t + \theta)$ output signal is sent to both multipliers on line 752. The resistance multiplier, R, in conjunction with the filter amplifier 790 performs the function of:

FORMULA 4:

$$V_R = \left(\frac{K}{T}\right)\int_{-\infty}^{t} (A\cos(\omega t))[B\cos(\omega t + \theta)]dt$$

$$= \left(\frac{K}{T}\right)\int_{-\infty}^{t} [AE_R\cos^2(\omega t) + AE_C\sin(\omega t)\cos(\omega t)]dt$$

$$= KAE_R$$

The SinCos internal in Formula 4 approaches zero, and the $\cos^2$ integral divided by the integration time approaches the average value of $AE_R$ multiplied by a proportionality constant, K.

Similarly the capacitance multiplier, C, in conjunction with amplifier 780 performs the function of:

FORMULA 5:

$$V_c = \left(\frac{K}{T}\right)\int_{-\infty}^{t} [AE_R\sin(\omega t)\cos(\omega t) + AE_C\sin^2(\omega t)]dt$$

$$= KAE_c$$

The SinCos integral is zero and the $\sin^2$ integral yields the voltage $V_C$. The voltages $V_R$ and $V_C$ are delivered to the microprocessor 800 where the signals are digitized and the values for coating thickness, t, are calculated from the following equations:

FORMULA 6:

$$t(\text{thickness}) = \frac{K_c}{V_c}$$

where $K_c$ is a function of the electronic scaling and the dielectric constant of the coating. In the preferred embodiment $K_c$ is equal to 0.003 inch volts for Kapton coatings:

FORMULA 7:

$$A(\text{area}) = K_R V_R$$

where $K_R$ is a function of the electronic scaling and the bulk resistivity of the sensors. In the preferred embodiment a value of 7.2 $(10^{-5})$ square inches per volt was used.

The microprocessor 800 also stores the information and enables printing or displaying of data on a monitor and controls the multiplexer. A set of controls 830 are utilized to operate the microprocessor 800.

7. Experimental Results

Eighteen steel and aluminum can samples (eight aluminum cans and ten steel cans) were collected off different production lines. The apparatus of the present invention was calibrated on 0.5 mil thick KAPTON film, a trademark of DuPont. Surface area and thickness evaluations using a Scanning Electron Microscope (SEM) were used to correlate the actual internal coating thickness to readings obtained by the present invention. The test locations 40a through 40e of FIG. 1 were used. The present inventions and SEM thickness readings are shown in Table I.

TABLE I

| Sample | Position[1] | Sensor[2] | $A_e$[3] | t[4] | SEM* |
|---|---|---|---|---|---|
| ALUMINUM | | | | | |
| 1 | 1 | 3 | 0.2 | 0.21 | 0.31–0.33 |
| 2 | 4 | 4 | 0.2 | 0.21 | 0.34–0.36 |
| 3 | 3 | 3 | 0.5 | 0.14 | 0.23–0.24 |
| 4 | 3 | 3 | 0.4 | 0.15 | 0.24–0.26 |
| 5 | 1 | 3 | 0.2 | 0.19 | 0.27–0.28 |
| 6 | 2 | 4 | 0.1 | 0.20 | 0.34–0.35 |
| 7 | 1 | 2 | 1.6 | 0.06 | 0.10–0.11 |
| 8 | 1 | 2 | 1.9 | 0.05 | 0.07–0.08 |
| STEEL | | | | | |
| 9 | 4 | 3 | 0.0 | 0.28 | 0.42–0.43 |
| 10 | 4 | 1 | 0.7 | 0.11 | 0.20–0.21 |
| 11 | 2 | 4 | 0.1 | 0.29 | 0.46–0.48 |
| 12 | 4 | 4 | 0.0 | 0.42 | 0.71–0.73 |
| 13 | 3 | 4 | 0.0 | 0.36 | 0.59–0.60 |
| 14 | 2 | 2 | 0.4 | 0.12 | 0.21–0.23 |
| 15 | 3 | 2 | 0.7 | 0.09 | 0.19–0.20 |
| 16 | 2 | 3 | 0.0 | 0.28 | 0.39–0.41 |
| 17 | 2 | 1 | 1.1 | 0.08 | 0.15–0.17 |
| 18 | 1 | 3 | 0.0 | 0.36 | 0.59–0.61 |

Figure 9:
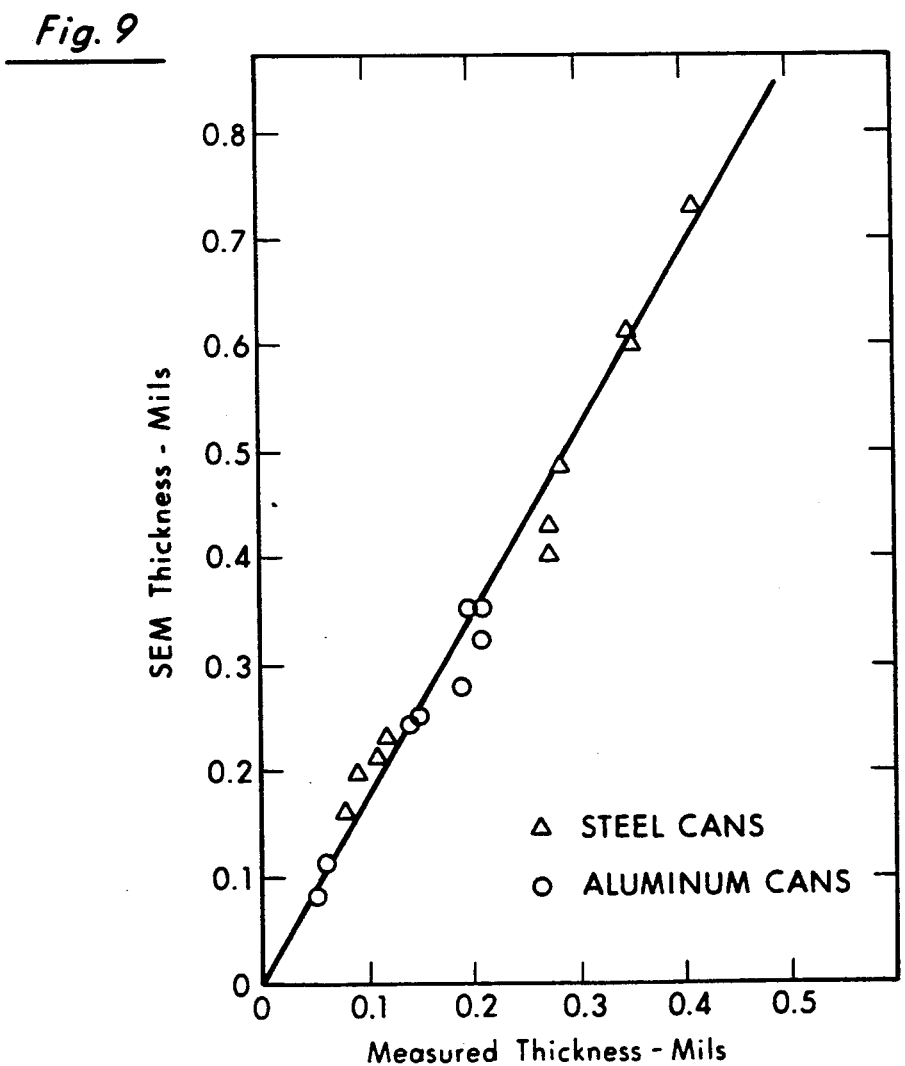
FIG. 9 sets forth the test result correlations showing the accuracy of the present invention.

*SEM measurements represents a thickness range $(10^{-3"})$.
[1]Positions are at 90° intervals
[2]Sensor 1 corresponds to location 40a, etc.
[3]Area of exposed metal as measured $(10^{-6} \text{ inches}^2)$
[4]Thickness of internal coating as measured $(10^{-3} \text{ inches})$ The difference in the dielectric constant of the actual coatings in the cans versus the Kapton that was used for calibration results in a correction factor of 1.6 to 1.7 as shown in FIG. 9.

It is to be expressly understood that the claimed invention is not to be limited to the description of the preferred embodiment but encompasses other modifications and alterations within the scope and spirit of the inventive concept.

We claim:

1. An apparatus for measuring in a predetermined area (A) of a coating over a metal surface of a container the thickness, t, of said coating and, when said coating is missing, the area, $A_e$, of exposed metal, said apparatus comprising:
   a sensor (222) formed from conductive flexible solid material,
   means (410) operative on said sensor for causing said sensor to engage said coating with a selected amount of force,
   means (710, 720, 730, 740, 750,) for applying a signal of predetermined frequency across said sensor and coating in said predetermined area (A) thereby causing said signal to change amplitude and phase so as to provide a resultant signal,
   means (760) receptive of said resultant signal from said applying means for producing a first output signal ($V_C$) based upon the capacitive reactance of said thickness of said coating being measured in said predetermined area, said first output signal corresponding to said thickness, t, of said coating, and
   means (770) receptive of said resultant signal from said applying means for producing a second output ($V_R$) based upon said resistive conductance of any said area of any exposed metal in said predetermined area, said second output signal corresponding to said area, $A_e$, of said exposed metal in said predetermined area.

2. An apparatus for measuring in the predetermined area (A) of a metal container the thickness, t, of an internal coating and, when the internal coating is defective, the area, $A_e$, of exposed metal, said apparatus comprising:
   means (710, 720, 730) for generating two sinusoidal signals of predetermined frequency ($\omega t$) and constant amplitude (A), said two sinusoidal signals being ninety degrees apart in phase: $A\sin(\omega t)$ and $A\cos(\omega t)$,
   means (740, 222, 750) receptive of said $A\cos(\omega t)$ signal from said generating means for applying said $A\cos(\omega t)$ signal across said internal coating in said predetermined area (A) of said container thereby causing said $A\cos(\omega t)$ signal to change amplitude (B) and phase ($\theta$) so as to provide a new signal: $B\cos(\omega t + \theta)$,
   first means (760) receptive of said $A\sin(\omega t)$ signal from said generating means and said $B\cos(\omega t + \theta)$ signal from said applying means for combining the aforesaid two signals together to produce an output ($V_C$) indicative of said thickness of said internal coating being measured in said predetermined area, and
   second means (770) receptive of said $A\cos(\omega t)$ signal from said generating means and said $B\cos(\omega t + \theta)$ signal from said applying means for combining the aforesaid two signals together to produce an output ($V_R$) indicative of said area of exposed metal in said predetermined area.

3. The apparatus of claim 2 wherein said predetermined frequency is in the range of about 10 kilohertz to about 50 kilohertz.

4. The apparatus of claim 3 wherein said frequency is 32 kilohertz.

5. The apparatus of claim 2 wherein said applying means sequentially applies said $A\cos(\omega t)$ signal to a plurality of different predetermined areas in said container so as to provide new signals, $B\cos(\omega t + \theta)$, for each said different predetermined area.

6. The apparatus of claim 5 wherein said predetermined areas are the same in area.

7. The apparatus of claim 2 wherein said generating means comprises:
   an oscillator for producing said predetermined frequency,
   a first amplifier connected to said oscillator for outputting said $A\sin(\omega t)$ signal, and
   a second amplifier connected to said oscillator for outputting said $A\cos(\omega t)$ signal.

8. The apparatus of claim 2 wherein said applying means comprises a sensor for engaging said predetermined area of said internal coating at a selected location of a selected interior configuration in said container.

9. The apparatus of claim 8 wherein said sensor comprises:
   a conductive rubber sensor (222),
   means (221, 400) for holding said sensor,
   means (210) for positioning said sensor perpendicularly over said predetermined area of said internal coating, said holding means being capable of a predetermined amount of movement within said positioning means, and
   means (410, 420) for selectively providing a selected amount of force to said sensor when said sensor engages said interior coating, said selected amount of force being large enough to cause said sensor to engage only said predetermined amount of area of said internal coating but small enough so as not to cause any destruction to said internal coating.

10. The apparatus of claim 8 further comprising means (230) for providing a support under the container at said sensor, said support corresponding in configuration to the interior configuration of said container under said sensor.

11. An apparatus for measuring in a predetermined area (A) of a metal container the thickness, t, of an internal coating and when the internal coating is defective, the area, $A_e$, of exposed metal, said container having a plurality of different internal configurations, said apparatus comprising:
   means (710, 720, 730) for generating two sinusoidal signals of predetermined frequency ($\omega t$) and constant amplitude (A), said two sinusoidal signals being ninety degrees apart in phase: $A\sin(\omega t)$ and $A\cos(\omega t)$,
   means (740, 720, 750) receptive of said $A\cos(\omega t)$ signal from said generating means for sequentially applying said $A\cos(\omega t)$ signal across said internal coating at a plurality of different said predetermined areas in said container thereby causing said $A\cos(\omega t)$ signal to change amplitude and phase thereby providing a new signal, $B\cos(\omega t + \theta)$, for each said different predetermined area, said new signal carrying information indicative of said thickness, t, and said area, $A_e$, said applying means comprising a separate sensor for engaging each said predetermined area of said internal coating at a selected interior configuration in said container, and
   means (230) for providing a support under the container at each said separate sensor, said support corresponding in configuration to the interior configuration of said container under each said separate sensor so as to prevent any change in said configuration of said container when each said separate sensor is sequentially applied.

12. An apparatus for measuring the thickness, t, of the internal coating of a container, said container having a number of different internal configurations, said apparatus comprising:
   a plurality of sensors (222), each of said sensors nondestructively engaging a predetermined area of said internal coating at a selected location of a selected interior configuration in said container,
   means (700) for applying a sinusoidal signal of predetermined frequency to each of said plurality of sensors thereby causing each said applied signal to change, said applying means outputting a new signal ($V_C$) indicative of the thickness of the internal coating at each said plurality of sensors,
   wherein each said sensor comprises:
   a conductive rubber sensor (222),
   means (221, 400) for holding said sensor,
   means (210) for positioning said sensor perpendicularly over said predetermined area of said internal coating, said holding means being capable of a predetermined amount of movement within said positioning means, and
   means (410, 420) for selectively providing a selected amount of force to said sensor when said sensor engages said interior coating, said selected amount of force being large enough to cause said sensor to engage only said predetermined amount of area of said internal coating but small enough so as not to cause any destruction to said internal coating.

13. An apparatus for measuring the thickness, t, of the internal coating of a container, said container having a number of different internal configurations, said apparatus comprising:
   a plurality of sensors (222), each of said sensors nondestructively engaging a predetermined area of said internal coating at a selected location of a selected interior configuration in said container,
   means (700) for applying a sinusoidal signal of predetermined frequency to each of said plurality of sensors thereby causing each said applied signal to change, said applying means outputting a new signal ($V_C$) indicative of the thickness of the internal coating at each said plurality of sensors,
   means (230) for providing a support under the container at each of said plurality of sensors, said support corresponding in configuration to the interior configuration of said container under each of said plurality of sensors.

14. The apparatus of claims 1, 2 or 11 further comprising means (230, 240) for preventing said container from contacting said applying means when said container is being inserted into or removed from said applying means.

15. The apparatus of claims 1, 2, 11 further comprising means (238) for providing a reference for use in marking (300) said container, said marking permitting said container to be removed and inserted from said apparatus for repeated measuring of said thickness and/or area of exposed metal when said marking is aligned with said providing means.

16. The apparatus for claim 19 further comprising means (320) for indicating at least one preselected angle of rotation; when said marking is aligned with said at least one indicating means, said applying means providing at least one additional resultant signal thereby creating at least one additional thickness, t, and/or area of exposed metal, $A_e$, along a circular profile line (1000) in said container.

17. The apparatus of claims 2, further comprising:

means (800) receptive of said thickness and said area of exposed metal, $A_e$, output from said first and second combining means for determining thickness and exposed metal area values for said predetermined area, means (810, 820) receptive of said thickness and exposed metal area values for outputting said values.

18. A method for measuring in a predetermined area (A) of a metal container the thickness, t, of an internal coating and, when the internal coating is defective, the area, $A_e$, of exposed metal, said method comprising the steps of:
  applying a conductive flexible solid sensor over the predetermined area of the internal coating with a selected amount of force,
  applying a signal of predetermined frequency across the sensor and the internal coating of the container in the predetermined area (A) of said container thereby causing said signal to change amplitude and phase so as to provide a resultant signal,
  producing an output signal ($V_C$) based upon the capacitive reactance of the thickness of the internal coating being measured in the predetermined area in response to the resultant signal, and
  producing an output ($V_R$) based upon said resistive conductance of the area of exposed metal in the predetermined area in response to the resultant signal.

19. A method for measuring in a predetermined area (A) of a metal container the thickness, t, of a internal coating and, when the internal coating is defective, the area, $A_e$, of exposed metal, said method comprising the steps of:
  generating two sinusoidal signals of predetermined frequency and constant amplitude, the two sinusoidal signals being ninety degrees apart in phase: $A\sin(\omega t)$ and $A\cos(\omega t)$,
  applying the $A\cos(\omega t)$ signal across the internal coating in the predetermined area (A) of the container thereby causing the $A\cos(\omega t)$ signal to change amplitude (B) and phase ($\theta$) so as to provide a new signal: $B\cos(\omega t + \theta)$,
  combining the $A\sin(\omega t)$ and $B\cos(\omega t+\theta)$ signals together to produce a capacitive reactance output ($V_C$) indicative of the thickness of said internal coating being measured in the predetermined area, and
  combining the $A\cos(\omega t)$ and $B\cos(\omega t+\theta)$ signals together to produce a resistive conductance output ($V_R$) indicative of the area of exposed metal in the predetermined area.

20. A method for measuring in a predetermined area (A) of a metal container the thickness, t, of an internal coating and when the internal coating is defective the area, $A_e$, of exposed metal, said method comprising the steps of:
  applying a conductive flexible solid sensor over the predetermined area of the internal coating with a selected amount of force,
  generating two sinusoidal signals of predetermined frequency and constant amplitude, the two sinusoidal signals being ninety degrees apart in phase: $A\sin(\omega t)$ and $A\cos(\omega t)$,
  sequentially applying the $A\cos(\omega t)$ signal across the sensor and the internal coating at a plurality of different predetermined areas in the container thereby causing the $A\cos(\omega t)$ signal to change amplitude and phase to provide a new signal, $B\cos(\omega t+\theta)$, for each of the different predetermined areas, said new signal carrying information indicative of said thickness, t, and said area of exposed metal, $A_e$, and
  providing a support under the container at the locations where each $A\cos(\omega t)$ signal is sequentially applied, the support corresponding in configuration to the interior configuration of the container so as to prevent any change in the configuration of the container as the aforesaid signal is applied.

21. An apparatus for measuring the thickness of the internal coating of a container, said apparatus comprising:
  at least one sensor, said at least one sensor comprising:
  a conductive rubber sensor (222),
  means (221, 400) for holding said sensor,
  means (210) for positioning said sensor perpendicularly over said predetermined area of said internal coating, said holding means being capable of a predetermined amount of movement within said positioning means,
  means (410, 420) for selectively providing a selected amount of force to said sensor when said sensor engages said interior coating, said selected amount of force being large enough to cause said sensor to engage only said predetermined amount of area of said internal coating but small enough so as not to cause any destruction to said internal coating, and
  means (700) for applying at least one sinusoidal signal of predetermined frequency to said at least one sensor thereby causing said applied signal to change into a new signal, said new signal being indicative of said thickness of the internal coating under said at least one sensor.

22. An apparatus for measuring the thickness, t, of the internal coating of a can, said can having a plurality of different configurations, said apparatus comprising:
  means (230) for supporting a portion of the cylindrical body 55 of said can, said supporting means conforming to the configurations of said portion of said can,
  means (250, 280) operative with said supporting means for firmly holding said can in said supporting means,
  a plurality of sensors (222),
  means (210) disposed within said can and holding said plurality of sensors for selectively engaging said plurality of sensors against said internal coating of said can in predetermined areas above said supporting means, said engaging means holding said plurality of sensors so that each said sensor perpendicularly engages said internal coating, and
  means (700) for applying a sinusoidal signal of predetermined frequency to each of said plurality of sensors thereby causing each said applied signal to change, said applying means outputting a new signal (Vc) based upon said changed applied signal indicative of the thickness of the internal coating at each said plurality of sensors.

23. The apparatus of claim 22 wherein each of said plurality of sensors comprises:
  a conductive rubber sensor (222),
  means (221, 400) for holding said sensor,
  means (210) for positioning said sensor perpendicularly over said predetermined area of said internal coating, said holding means being capable of a predetermined amount of movement within said positioning means, and means (410, 420) for selectively providing a selected amount of force to said sensor when said sensor engages said interior coating, said selected amount of force being large enough to cause said sensor to engage only said predetermined amount of area of said internal coating but small enough so as not to cause any destruction to said internal coating.

24. The apparatus of claim 22 further comprising means (230, 240) for preventing said can from contacting said sensors as said can is being inserted into or removed from said apparatus.

25. The apparatus of claim 22 further comprising:

means (238) for providing a reference for use in marking (300) said can, said marking permitting said can to be removed and inserted from said apparatus for repeated measuring of said thickness and/or area of exposed metal when said marking is aligned with said providing means.

26. The apparatus for claim 22 further comprising means (320) for indicating at least one preselected angle of rotation; when said marking is aligned with said at least one indicating means.

27. The apparatus of claim 22 wherein said applying means provides at least one additional resultant signal thereby creating at least one additional thickness, t, along a circular profile line (1000) in said can

* * * * *